(12) United States Patent
Piatkiewicz et al.

(10) Patent No.: US 11,697,053 B1
(45) Date of Patent: Jul. 11, 2023

(54) TACTICAL BOARD WITH EMBEDDED MAGNETS

(71) Applicants: Zbigniew Piatkiewicz, Windsor (CA); Michael Lupenec, Macomb Township, MI (US)

(72) Inventors: Zbigniew Piatkiewicz, Windsor (CA); Michael Lupenec, Macomb Township, MI (US)

( * ) Notice: Subject to any disclaimer, the term of this patent is extended or adjusted under 35 U.S.C. 154(b) by 0 days.

(21) Appl. No.: 16/819,482

(22) Filed: Mar. 16, 2020

Related U.S. Application Data

(60) Provisional application No. 62/818,176, filed on Mar. 14, 2019.

(51) Int. Cl.
*A63B 71/06* (2006.01)

(52) U.S. Cl.
CPC ......... *A63B 71/06* (2013.01); *A63B 2071/0694* (2013.01); *A63B 2209/08* (2013.01)

(58) Field of Classification Search
CPC ............... A63B 71/06; A63B 2209/08; A63B 2071/0694; A63F 9/34; A63F 2003/0063; A63F 2003/00545; A63F 2003/00927; A63F 3/00694
USPC .. 273/240, 249, 287, 456; 434/247, 416, 428, 434/365, 403, 408
See application file for complete search history.

(56) References Cited

U.S. PATENT DOCUMENTS

| 3,654,711 | A | * | 4/1972 | Taylor | B43L 1/045 434/425 |
| 4,192,508 | A | * | 3/1980 | Livick | A63F 7/0088 273/118 A |
| 4,676,527 | A | * | 6/1987 | Palmer | A63B 69/00 24/306 |
| 5,263,866 | A | * | 11/1993 | Campbell | A63F 3/00533 434/247 |
| 5,664,780 | A | * | 9/1997 | Bricker | A63B 71/06 273/239 |
| 5,827,072 | A | * | 10/1998 | Neufer et al. | A63B 69/002 434/416 |
| 5,836,585 | A | * | 11/1998 | LaCivita | A63F 3/00895 273/287 |
| 5,997,309 | A | * | 12/1999 | Metheny et al. | B43L 1/008 434/408 |
| 6,379,156 | B1 | * | 4/2002 | Laravea et al. | A63B 69/00 434/247 |
| 6,464,507 | B1 | * | 10/2002 | Bailey | G09B 19/0038 434/247 |
| 6,866,516 | B2 | | 3/2005 | Smith et al. | |
| 7,210,936 | B2 | | 5/2007 | Moeller et al. | |
| 7,874,842 | B2 | | 1/2011 | Beno | |
| 8,641,426 | B2 | * | 2/2014 | Yang | A63B 71/06 434/408 |

(Continued)

*Primary Examiner* — Sebastiano Passaniti
(74) *Attorney, Agent, or Firm* — Cramer Patent & Design, PLLC; Aaron R. Cramer

(57) ABSTRACT

A tactical board includes embedded magnets secured therewithin the tactical board. A transparent cover overlays the magnets and substrate. A stylus is provided to manipulate the position of the magnets on the substrate. The tactical board preferably includes indicia in the form of common sorts playing surfaces or the like.

1 Claim, 5 Drawing Sheets

(56) References Cited

U.S. PATENT DOCUMENTS

| | | | |
|---|---|---|---|
| 9,481,199 B2 | 11/2016 | Shanbour, II et al. | |
| 9,873,286 B1 | 1/2018 | Mcatee | |
| 10,300,367 B1* | 5/2019 | Douglas, Jr. | A63F 3/00694 |
| 2004/0007818 A1* | 1/2004 | Newman | A63F 7/0668 |
| | | | 273/317 |
| 2004/0217546 A1* | 11/2004 | Gambrell | A63F 3/00031 |
| | | | 273/244.1 |
| 2005/0022439 A1* | 2/2005 | Crump | G09F 1/12 |
| | | | 40/711 |
| 2006/0043673 A1* | 3/2006 | Brown | A63B 71/06 |
| | | | 273/239 |
| 2006/0226603 A1* | 10/2006 | Webber, Jr. et al. | G09B 1/08 |
| | | | 273/239 |
| 2006/0232007 A1* | 10/2006 | Kuehn | A63F 3/0023 |
| | | | 273/239 |
| 2007/0020444 A1* | 1/2007 | Moore | B43L 1/008 |
| | | | 428/195.1 |
| 2009/0233265 A1* | 9/2009 | Budryk et al. | B43L 1/00 |
| | | | 434/416 |
| 2012/0064494 A1* | 3/2012 | Vinther | A63F 7/0088 |
| | | | 434/247 |
| 2013/0106055 A1* | 5/2013 | Knox | A63F 3/00694 |
| | | | 273/239 |
| 2014/0353910 A1* | 12/2014 | Nwanna | A63F 7/0616 |
| | | | 273/108.1 |
| 2020/0206601 A1* | 7/2020 | Martin, III et al. | A63F 3/02 |

* cited by examiner

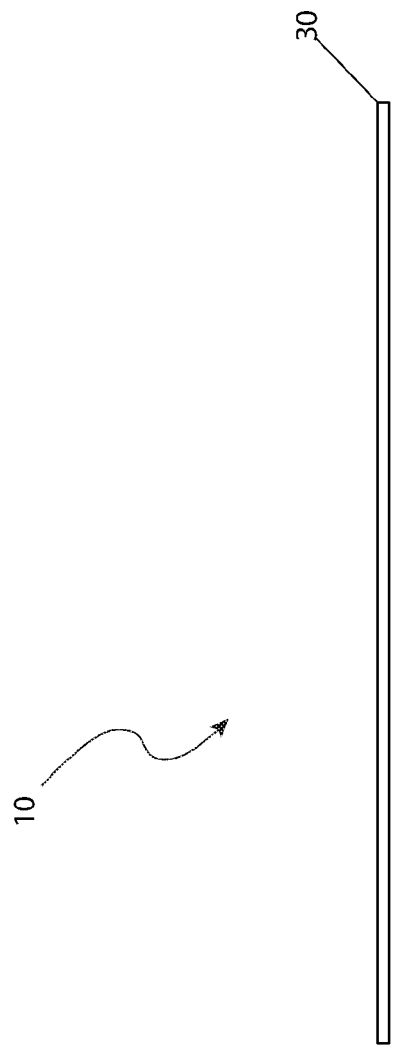

TACTICAL BOARD WITH EMBEDDED MAGNETS

RELATED APPLICATIONS

The present invention was first described in and claims the benefit of U.S. Provisional Pat. Application No. 62/818,176 filed on Mar. 14, 2019, the entire disclosures of which are incorporated herein by reference.

FIELD OF THE INVENTION

The present invention relates generally to a tactical board and more specifically to a tactical board having embedded magnets.

BACKGROUND OF THE INVENTION

Coaching in sports requires a lot of pre-planning and instruction. Common tasks that a coach or trainer must prepare a player for includes proper nutrition, personal skill training, and mental and emotional focus, among others. Sports can be either individual or team-oriented.

A major task of a coach is to instruct an individual or a team of proper tactics specific to that sport. This is especially true with team sports, such as football, baseball, hockey, and soccer. Even though it is preferred that this tactical instruction is delivered in a practice or extended time session, often times it is necessary to provide such instruction right before the game on a field or during the game, such as halftime or during a stoppage in play, such as a time out.

Also, it is necessary to be able to quickly instruct such players, especially in a team setting, where the coach can display the tactical structure and common movements and anticipated events and reactions with an implement that enables such actions. An easy-to-use and easy-to-view type of coaching implement is therefore beneficial. The tactical board with embedded magnets fulfills this need.

SUMMARY OF THE INVENTION

In view of the foregoing disadvantages inherent in the prior art, it has been observed that there is need for a tactical board which comprises a substrate delineated between a field section and an open section and a cover which is positioned overtop a first side of the substrate. The cover is coextensive with the substrate and mounted parallel thereto at a height there above. The tactical board also comprises a border binding a common perimeter edge of the substrate and the cover and an interstitial space which is bounded by the substrate, the cover, and the border. The interstitial space includes a plurality of markers that reside within the interstitial space. The tactical board also comprises a field section having a plurality of features that delineate a common sports playing field. A reverse side of the substrate is coated with a marking surface to enhance one or more instructional features.

The substrate may be magnetic or may comprise a magnetic coating. The cover may be transparent and may be made of acrylic or glass. The common perimeter edge may be continuous to provide a continuous integral element and may include a plurality of frame pieces to provide a continuous integral element. The border adhesively bonds to the perimeter edges of the substrate and the cover. The border may be conjoined with a friction-style fitting to the perimeter edges of the substrate and the cover. The cover may be a transparent view of the open section and the field section may be unimpeded.

Each of the markers are magnetic to enable a magnetic communication with the substrate in order to secure retention of its position thereon when positioned. Each of the markers may be coated with a magnetic material to enable the magnetic communication with the substrate in order to secure retention of its position thereon when positioned. Further retention of the markers, the interstitial space may be at a height that may be slightly greater than the thickness of each of the markers to restrict them from unintended movement when the entire board may be moved. The features are a plurality of indicia that resemble a sports playing field which may be located centrally on the substrate or may be biased on a side of the substrate.

A magnetic stylus may be provided with the board to facilitate positioning of any of the markers on the substrate. The magnetic stylus may have a magnetic tip portion of the stylus or the magnetic stylus may be magnetic.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a first side elevation view of the tactical board 10, according to the preferred embodiment of the present invention;

FIG. 5 is a second side elevation view of the tactical board 10, according to the preferred embodiment of the present invention;

Figure 1:
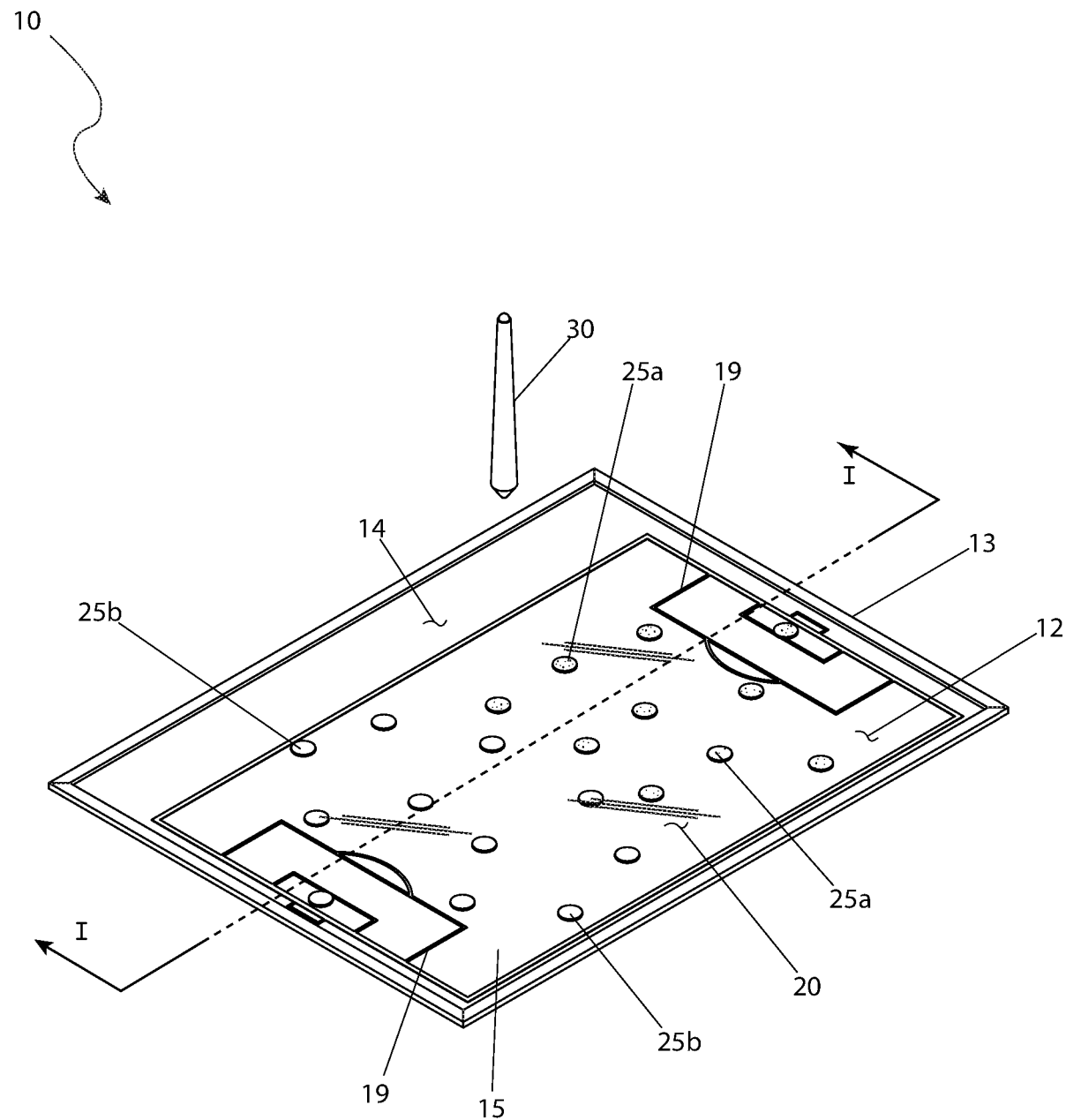
FIG. 1 is a perspective view of a tactical board 10, according to the preferred embodiment of the present invention.
Figure 2:
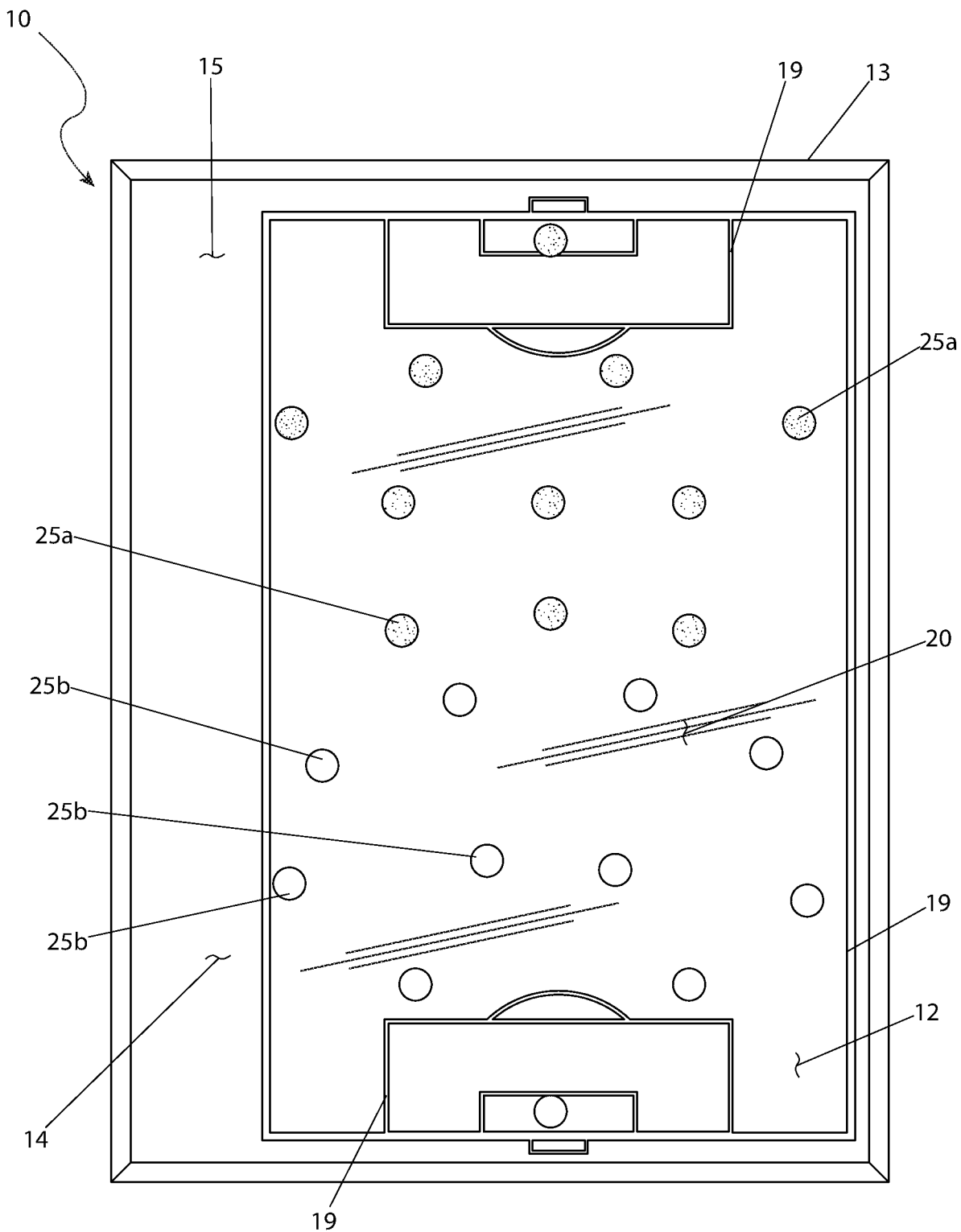
FIG. 2 is a top plan view of the tactical board 10, according to the preferred embodiment of the present invention.
Figure 3:
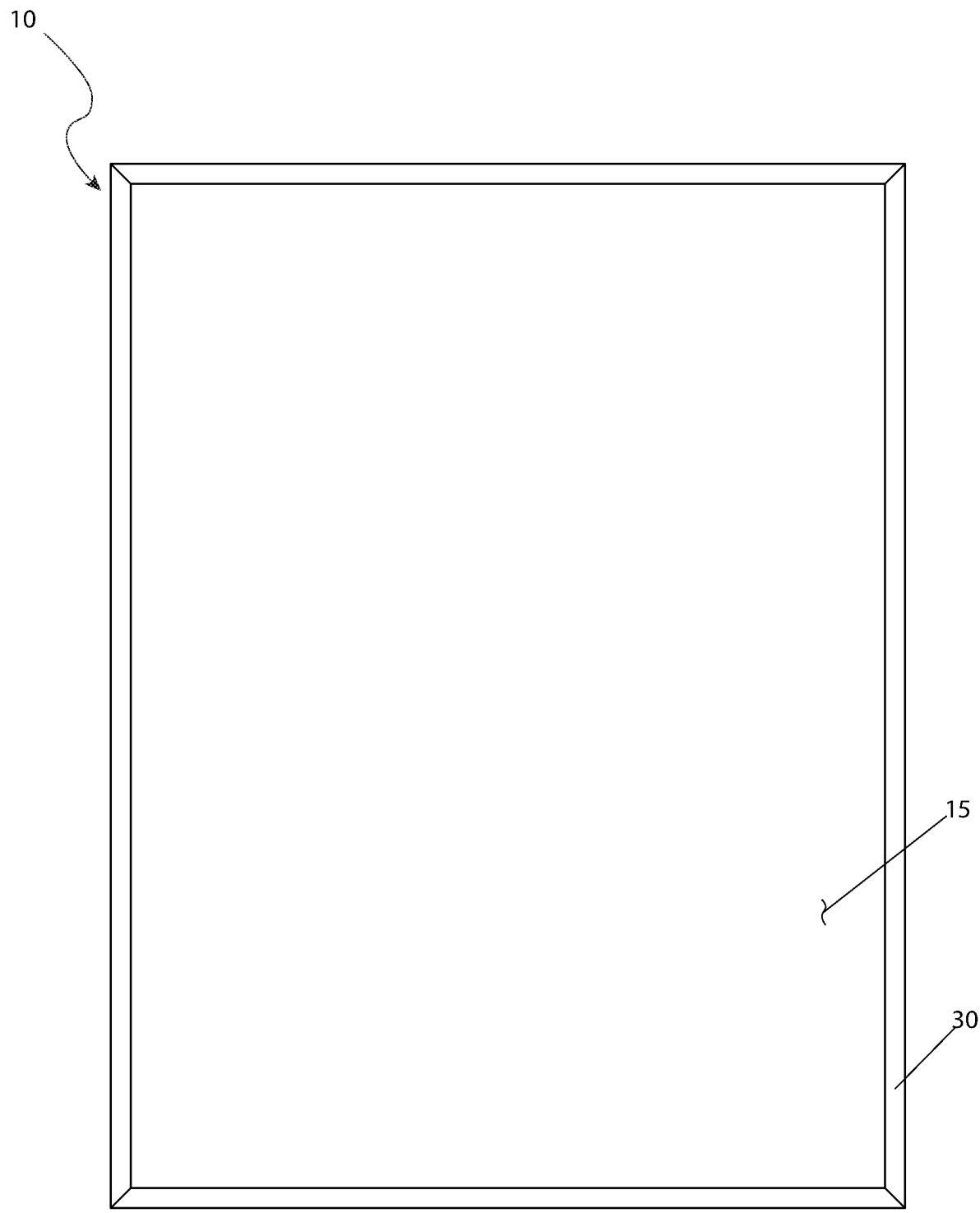
FIG. 3 is a bottom plan view of the tactical board 10, according to the preferred embodiment of the present invention.

| DESCRIPTIVE KEY | |
|---|---|
| 10 | tactical board |
| 12 | cover |
| 13 | border |
| 14 | open section |
| 15 | substrate |
| 20 | field section |
| 25a | first marker |
| 25b | second marker |
| 27 | interstitial space |
| 30 | stylus |

1. Description of the Invention

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIGS. 1 through 5, various views of a tactical board 10, which enables user, such as a coach or trainer, to selectively motion any one (1) of a given marker 25a, 25b on the board 10 to provide instruction on tactical strategies of a sporting game. The board 10 is capable of being handled by the user and is generally sized similar to a conventional sheet of paper (e.g. eight-and-a-half by eleven inches (8-½ x 11 in.) or similar.

The board 10 essentially comprises a substrate 15 delineated between a field section 20 and an open section 14 and has a cover 12 positioned overtop a first side of the substrate. The cover 12 is coextensive with the substrate 15 and mounted parallel thereto at a height there above. The common perimeter edge of the substrate 15 and cover 12 is bound with a border 13 that may be continuous or comprise multiple frame pieces to provide a continuous integral element. The border 13 may be adhesively or otherwise affixed to the perimeter edges of the substrate 15 and cover 12, or merely conjoin them with a friction-style fitting. The volume of the space bounded by the substrate 15, cover 20, and border 13 is defined as an interstitial space 17.

The field section 20 comprises the majority of the substrate 15 and preferably has indicia 19 or features that delineate a common sports playing field. The exemplary embodiment shown in FIG. 1 provides for the indicia 19 to resemble a soccer playing field, although indicia 19 resembling other playing fields such as volleyball, football, hockey can be used and understood to fall under the overall scope of the invention. The field section 20 can be located centrally on the substrate 15 or be biased towards any side. The remainder of the substrate 15 is defined as the open section 14, which may be left blank or carry a logo, a text, or any other feature. In a preferred embodiment, the entirety of the substrate 15 is magnetic or has a magnetic coating or top layer. Other embodiments may require that only the field section 20 is magnetic or the field section 20 and at least a portion of the open section 14 is magnetic. The cover 20 is transparent and may be an acrylic material or glass, such that view of the open section 14 and field section 20 is unimpeded.

Figure 6A:
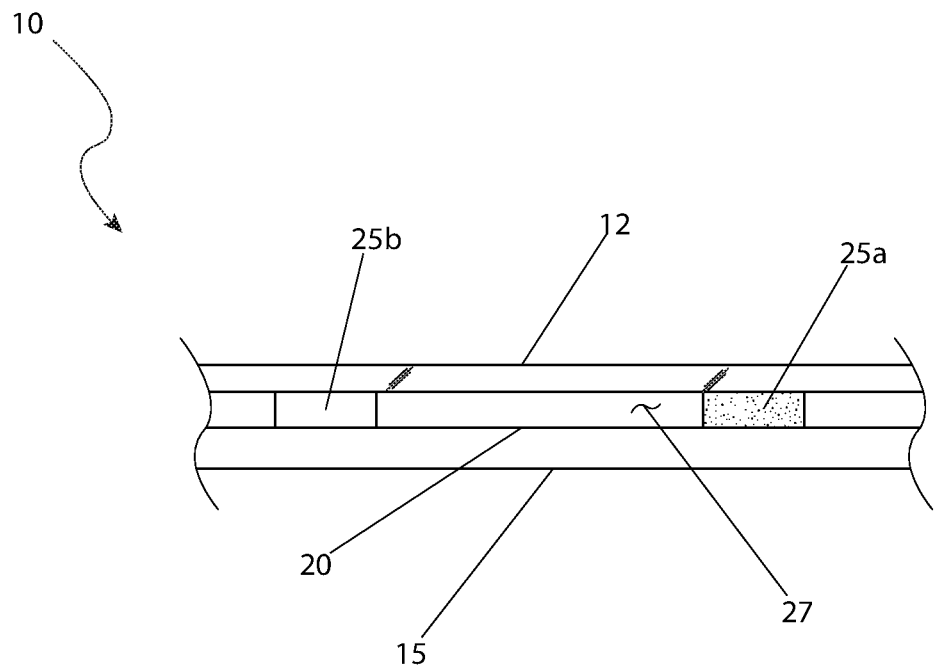
FIG. 6a is a cross-sectional view of the tactical board 10 along the line I-I (see FIG. 1), where a second marker 25b is in a first position, according to the preferred embodiment of the present invention; and, FIG. 6b is a cross-sectional view of the tactical board 10 along the line I-I (see FIG. 1), where a second marker 25b is in a second position, according to the preferred embodiment of the present invention.
Figure 6B:
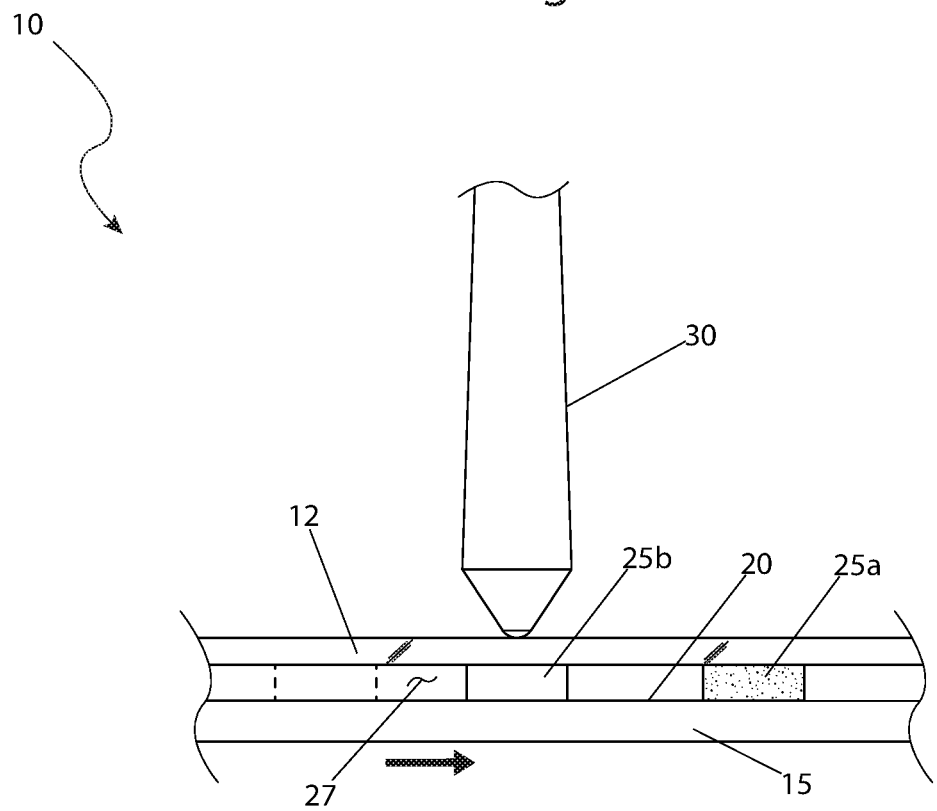

Referring more closely now to FIGS. 6a and 6b, there are a plurality of markers 25a, 25b that reside within the interstitial space 27. Each of a plurality of first markers 25a will typically be manufactured and shaped similar or identical to each of a plurality of second markers 25b; however there typically is a single or collective feature on each of the plurality of first markers 25a that discern them, as a group, from each of the plurality of second markers 25b. The markers 25a, 25b may be identical or may have different colors to represent different types of players or different teams of players, or they may be a different shape, with the overall preference being that their thickness is identical. Each marker 25a, 25b is preferably magnetic or coated with a magnetic material to enable a magnetic communication with the substrate 15 in order to secure the retention of its position thereon when positioned. To further the retention of the markers 25a, 25b, the interstitial space 27 is preferably of a height that is slightly greater than the thickness of each marker 25a, 25b to restrict them from unintended movement when the entire board 10 is moved. The markers 25a, 25b can be moved along the entirety of the substrate 15 (i.e. anywhere on the open section 14 or field section 20 that is also magnetic).

To facilitate the positioning of any of the markers 25a, 25b on the substrate 15, a magnetic stylus 30 is provided with the board 10. This is particularly shown in FIG. 6b. All or a tip portion of the stylus 30 is magnetic, and of a strength enabling it to achieve a magnetic connection to any marker 25a, 25b through the cover 20. The magnetic connection between the stylus 30 and any marker 25a, 25b can be broken with a pulling away force once the position of the individual marker 25a, 25b is selected.

In another embodiment, the reverse side of the substrate 15 (i.e., the side opposite the open portion 14 and field portion 20) may be coated with a marking surface (e.g., a chalkboard, dry erase board, etc.) to enhance instructional features given. Also, the cover 20 may be of a material that is not only transparent, but capable of being marked with a removable marking implement (e.g. wax markers).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A tactical board, consisting of:
a substrate delineated directly between a field section and an open section;
a cover positioned directly overtop a first side of the substrate, the cover is coextensive with the substrate and mounted parallel thereto at a height there above;
a border binding directly a common perimeter edge of the substrate and the cover;
an interstitial space bounded directly by the substrate, the cover, and the border, the interstitial space includes a plurality of markers that reside directly within the interstitial space; and
a magnetic stylus is provided with the board to facilitate positioning of any of the markers on the substrate;
wherein the field section having a plurality of features that delineate a sports playing field;
wherein a reverse side of the substrate is directly coated with a marking surface to enhance one or more instructional features;
wherein the substrate is magnetic and has a magnetic coating;

wherein the plurality of features of the field section are a plurality of indicia that resemble the sports playing field;

wherein the field section is located centrally on the substrate;

wherein the common perimeter edge is continuous to provide a continuous integral element;

wherein the cover provides an unimpeded transparent view of the open section and the field section;

wherein the magnetic stylus has a magnetic tip portion of the stylus;

wherein the cover is made of acrylic or glass;

wherein the border adhesively bonds to the common perimeter edge of the substrate and the cover;

wherein the border is conjoined with a friction-style fitting to the common perimeter edge of the substrate and the cover;

wherein each of the markers are magnetic to enable a magnetic communication with the substrate in order to secure retention of its position thereon when positioned;

wherein each of the markers are coated with a magnetic material to enable the magnetic communication with the substrate in order to secure retention of its position thereon when positioned;

wherein for further retention of the markers, the interstitial space is at a height that is slightly greater than a thickness of each of the markers to restrict them from unintended movement when the entire board is moved; and wherein the field section is biased on a side of the substrate.

* * * * *